United States Patent [19]

Grünert

[11] 4,197,571
[45] Apr. 8, 1980

[54] END SECTION FOR CONNECTING A GENERATOR TAKEOFF TO A BLOCK TRANSFORMER

[75] Inventor: Gerhard Grünert, Erlangen, Fed. Rep. of Germany

[73] Assignee: Siemens Aktiengesellschaft, Münich, Fed. Rep. of Germany

[21] Appl. No.: 926,379

[22] Filed: Jul. 20, 1978

Related U.S. Application Data

[63] Continuation of Ser. No. 725,731, Sep. 23, 1976, abandoned.

[30] Foreign Application Priority Data

Oct. 13, 1975 [DE] Fed. Rep. of Germany ....... 2545832

[51] Int. Cl.² .............................................. H02B 1/04
[52] U.S. Cl. .................................... 361/341; 361/335; 174/18; 174/99 E
[58] Field of Search ................................ 361/331–335, 361/340, 341, 378; 174/18, 21 JR, 21 JC, 21 CA, 86, 99 E

[56] References Cited

U.S. PATENT DOCUMENTS

| | | | |
|---|---|---|---|
| 3,701,929 | 10/1972 | Taguchi | 361/378 |
| 3,819,845 | 6/1974 | Tahiliani | 174/18 |
| 3,842,187 | 10/1974 | Barkan | 174/38 |
| 4,016,382 | 4/1977 | Roth | 200/148 R |

Primary Examiner—Gerald P. Tolin
Attorney, Agent, or Firm—Kenyon & Kenyon

[57] ABSTRACT

A single phase, metal encapsulated generator takeoff for generators of large power rating, which permits equalization of position tolerances in the vertical and horizontal direction when making the connection to a block transformer without effort in which each phase of the generator leadoff consists of a rigid inner conductor and a cylindrical, gas-tight tubular envelope which surrounds the inner conductor concentrically and in which the inner conductor is supported by support insulators, and which has ring-like expansion compensators at suitable spacings for taking up length changes caused by temperature variations. The inner conductor is connected to the terminals of the block transformer by expansion strips. The end section of the tubular enclosure of each phase facing the block transformer has two spaced joints, tiltable in all directions, in the form of expansion compensators. The inner conductor is provided with a third joint which permits tilting in all directions at the height of the expansion compensator which is the one of the two farther away from the transformer.

9 Claims, 5 Drawing Figures

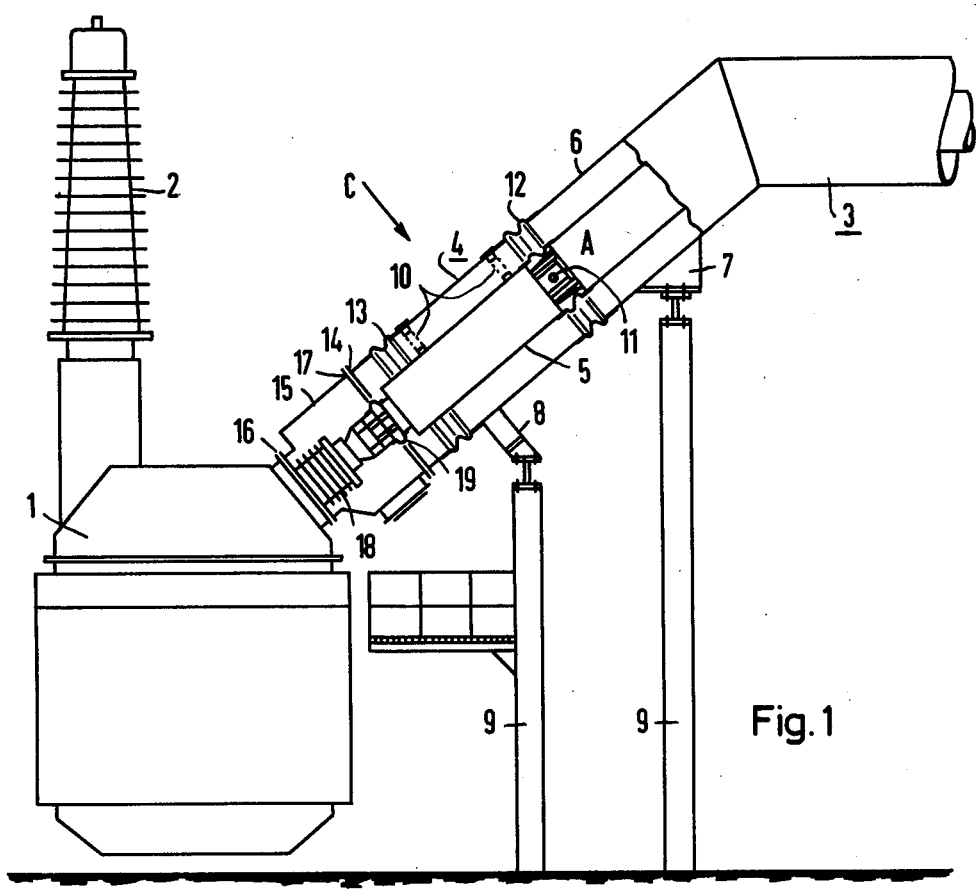
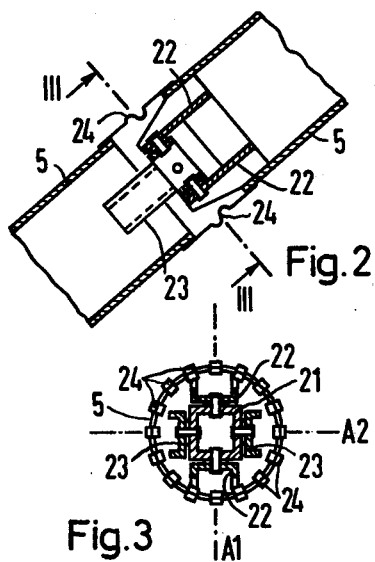
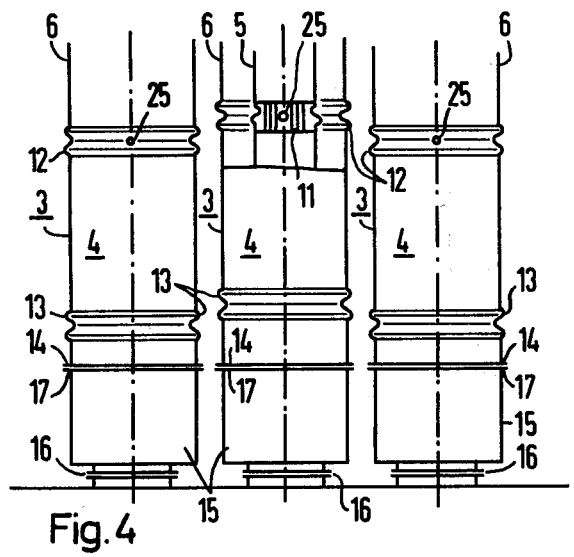
Fig. 1
Fig. 2
Fig. 3
Fig. 4

END SECTION FOR CONNECTING A GENERATOR TAKEOFF TO A BLOCK TRANSFORMER

This is a continuation of application Ser. No. 725,731, filed Sept. 23, 1976, and now abandoned.

BACKGROUND OF THE INVENTION

The invention relates to generators in general and more particularly to an improved single phase, metal encapsulated generator takeoff for generators of large power rating. Generator takeoffs consisting of a rigid inner conductor and a cylindrical, gas-tight tubular envelope which surrounds the inner conductor concentrically and in which the inner conductor is supported by support insulators, and which has ring-like expansion compensators at suitable spacings for taking up length changes caused by temperature variations, the inner conductor being connected to the brought-out leads of the block transformer by expansion strips, for each phase are commercially available.

The takeoffs of generators of large power ratings to block transformers require a very large amount of space because of the high voltages and large currents that occur. Thus, according to the new design guidelines of the power station operators, a conductor diameter of 760 mm and a tubular enclosure diameter of 1500 mm are required at the block transformer terminal for generator takeoffs with a generator power of 1700 MVA and which are self cooling. The block transformers which correspond to these power requirements and step up the medium voltage supplied to a high voltage of 380/220 kV, are accordingly large.

The cylindrical inner conductor for each phase is surrounded by an outer, hermetically sealed tubular enclosure. Compressed air with an overpressure of about a 200 mm water column over ambient pressure is maintained in the interior of the tubular enclosure, in order to prevent moisture and dust from penetrating into the interior of the tubular enclosure. The inner conductors and the likewise electrically conducting tubular enclosure carry phase shifted currents for each of the three phases in order to keep the short circuit forces between the phase conductors low and to maintain centering of the inner conductor. At suitable spacings, the tubular enclosures have expansion compensators in the form of bellows or corrugated pipes, in order to take up the length changes of the tubular enclosure as the result of variations of the ambient temperature and thereby to reduce the occurrence of mechanical stresses in the axial direction of the takeoff.

Because of the tolerance problems that occur, the connection of the generator takeoff to the block transformer always becomes an extremely difficult and labor consuming undertaking. Thus, when connecting block transformers with an apparent power of 725 MVA, tolerances of about ±50 mm in the horizontal and vertical direction can be expected.

One way to equalize the tolerances is to insert adapters of suitable dimensions for the inner conductor and the tubular enclosure in order to bring about an equalization of tolerances in each individual case. However, this requires extensive modification work.

Another method to equalize the relative position deviations when connecting the generator takeoffs to the block transformer is to provide enlarged flanges for the tubular enclosure at the coupling point, in order to ensure a sufficiently large minimum contact area of the adjoining flanges, the areas of which only partly overlap. The flanges to be joined together are then pressed together by clamps applied from the outside, since the holes in the flanges for receiving the connecting bolts do not line up because of the deviations in position and therefore, direct bolting together of the flanges is no longer possible. This, however, presupposes an extremely strong design of the flanges, so that the forces occurring at the joint between the tubular enclosure and the flange can be absorbed without destruction. The enlargement of the flange diameter also bring about space problems since the space required for each individual generator takeoff connection becomes larger. The spacing between the individual phases of the generator takeoff would therefore have to be increased at the transformer terminals. In addition, this kind of tolerance equalization is also very expensive.

Thus, there is a need for a generator takeoff of the type mentioned above which permits tolerance equalization as well as being easy to install at the block transformer without substantially increasing the outside diameter of the tubular enclosure.

SUMMARY OF THE INVENTION

According to the present invention, this need is satisfied by providing the end section of the tubular enclosure of each phase facing the block transformer with two spaced joints which are each implemented with an expansion compensator and which can be tilted in all directions, and by providing the inner conductor with a third joint, which permits tilting in all directions, located at the height of the one of the two expansion compensators which is farther away from the transformer.

The solution according to the present invention eliminates the problems pointed out above. Without enlargement of the diameter of the tubular enclosure beyond the outside dimensions of the expansion compensators and standard flanges, an effortless equalization of tolerances in all directions is possible through the third joint in the inner conductor and the arrangement of the expansion compensators, when the tubular enclosure is connected to the transformer. Due to the expansion compensator which is located at the height of the third joint and which, in addition to its axial elasticity, also allows tilting in all directions within a limited angular range, and due to the second expansion compensator closer to the transformer, the end section of the generator takeoff facing the block transformer has two potential bending points which ensure plane-parallel contact of two connecting flanges of the tubular enclosure close to the transformer even if vertical or horizontal deviations occur. The functioning of the expansion compensators as joints can also be accomplished by other gas-tight joints tiltable in all directions, for instance, by joints constructed from spherical segments. Because of the tolerance equalization of the tubular enclosure taking place in the expansion compensators, the connecting flanges need not be oversize and can be designed and bolted together as standard flanges. Each tubular enclosure therefore has no parts which protrude appreciably outwardly and therefore require additional space. With the exception of the third joint, which can be implemented inexpensively, the new generator takeoff has no elements which require special fabrication or which require great installation effort. Expansion compensators, even if disposed heretofore at less advantageous points, were already needed in the prior art apparatus. The coupling flanges located in the vicinity of the transformer are considerably smaller and less highly stressed than with the method mentioned at the outset and are connected with little effort by bolting. The installation effort for connecting a generator takeoff with tolerances to the block transformer is so greatly simplified that, for instance, power stations can satisfy heavily varying power demands with the existing transformer inventory in such a manner that a transformer can be replaced on short notice. It is even possible to connect the generator takeoff to block transformers with different phase spacings.

In one advantageous embodiment, the third joint is a ball joint or a knuckle joint. These joints allow the desired tilting in all directions while being highly reliable and rugged.

In this connection, it is advantageous if the third joint is bridged by metallic ribbons. This avoids large currents acting on the parts of the joint. Thus, constant quality of the contact and far reaching relief of the parts of the joint from the current flow is achieved. It is further advantageous if the third joint is fastened to be insulated from the inner conductor. This permits complete separation of the functions of electric conduction and of a joint.

Furthermore, the expansion compensators may be aluminum compensators. This assures the electric conductivity of the tubular enclosure over the expansion compensator.

It is further advantageous if the end section of each phase of the generator takeoff is tiltably supported in the radial direction using a hydraulic arrangement or tension and pressure screws via a height support. Thereby, an effortless and accurate initial adjustment of the end sections of the generator takeoff facing the block transformer is achieved before the connecting flanges are bolted together.

In one advantageous embodiment, corresponding expansion compensators of adjacent tubular enclosures of different phases are mutually staggered in the axial direction. This measure accomplishes further space savings, since expansion compensators protruding beyond the outside diameter of the tubular enclosures will thus not lie opposite each other. Therefore, the spacing between adjacent tubular enclosures of different phases can be further reduced.

BRIEF DESCRIPTION OF THE DRAWINGS

FIG. 1 is a partial cross-sectional side view of a block transformer and the generator of the present invention.

FIG. 2 is an axial cross-section of the inner conductor designated as detail A in FIG. 1, provided with the third joint in the form of a knuckle joint.

FIG. 3, a cross-section through the knuckle joint of FIG. 2 perpendicular to the axis of the inner conductor taken along the line III—III.

FIG. 4, is a view in the direction C of FIG. 1 onto the generator takeoffs associated with the three phases.

DETAILED DESCRIPTION OF THE INVENTION

Figure 5:
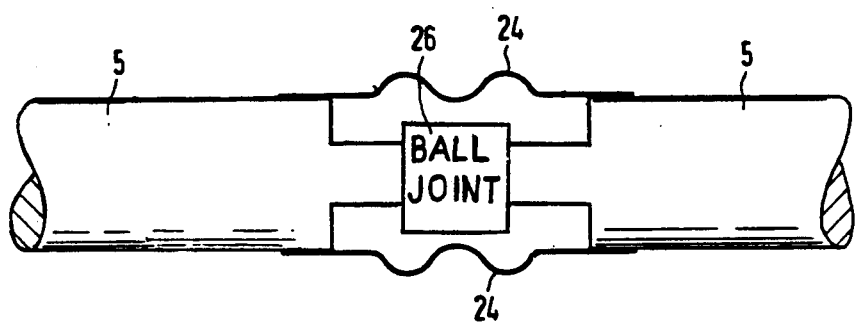
FIG. 5 is a block diagram view of the inner conductor of the present invention provided with the third joint in the form of a ball joint.

FIG. 1 illustrates the housing in which the encapsulated block transformer is accommodated, and the transformer output 2 on the high voltage side. A phase 3 of the generator leadoff has an end section 4 extending at an angle downward toward the block transformer housing 1. As can be seen from the end section 4 of the phase 3 of the generator takeoff shown in cross-section, it consists of a cylindrical inner conductor 5 as well as an outer, gas tight tubular enclosure 6 arranged concentrically to the inner conductor.

The end section 4, extending downward at an angle, of each phase of the generator leadoff 3 is supported by tubular enclosure supports 7 and 8, which are mounted on pillars 9 anchored in the floor. The inner conductor 5 is braced against the inside wall of the tubular enclosure 6 by support insulators 10.

The inner conductor 5 of the end section 4 of each phase of the generator takeoff 3 shown in FIG. 1 has a joint 11, approximately at its center. This joint, which is the third joint referred to above, permits radial tilting in all directions within a limited angular range. The detail A of the joint of the inner conductor 5 is shown on FIG. 2, which will be explained below.

At the height of the third joint 11, the tubular enclosure 6 has an aluminum expansion compensator 12 in the form of bellows or a corrugated pipe. Several such expansion compensators are distributed over the entire length of the generator takeoff 3, not shown here. The expansion compensators are designed in the form of bellows and are compressible in the axial direction. They take up length changes of the tubular enclosure 6, which occur as the result of variations of the ambient temperature, in order to prevent damage to the tubular enclosure due to the forces associated with the length changes. In addition to its axial compressibility, the bellows-like design of the expansion compensators 12 also allows a certain amount of tilting of the tubular enclosure sections which are connected by such an expansion compensator with respect to each other. Therefore, the axes of the tubular enclosure sections connected by an expansion compensator may enclose an angle different from 180° without damage to the tubular enclosure sections or the expansion compensator.

Besides the expansion compensator 12 located between the enclosure supports 7 and 8, the tubular enclosure 6 has a further aluminum expansion compensator 13 which is disposed toward the transformer housing 1 relative to the enclosure support 8. The expansion compensator 13 may also be made of an elastic, nonconductive material, e.g., neoprene. Thereby, good vibration and sound isolation of the tubular enclosure sections adjoining this expansion compensator can be achieved.

The tubular enclosure section following the expansion compensator 13 in a direction toward the transformer housing 1 ends in a flange 14. Because the expansion compensator assumes the function of a joint, the flange 14 is tiltable radially in all directions. Superimposed on this tiltability is a tiltability in all directions of the entire tubular enclosure section located below the expansion compensator 12 as the consequence of the joint 11 at the inner conductor as well as of the expansion compensator 12 at the outer conductor, which is mounted at the height of the former and assumes the function of a joint. Thus, the part 6 of the tubular enclosure which extends at an angle downward and ends in the flanges 14, has two potential bending points.

The adapter 15, which is provided on both sides with flanges 16 and 17, can therefore be bolted without great effort to the transformer housing 1 and to the flange 14 of the tubular enclosure part 6, which extends downward at an angle, even if considerable tolerances occur between the connection points. Due to the elements 11, 12 and 13 which provide mobility of the end section 6 in all directions, it is easy to bring about a plane-parallel position of the flanges 14 and 17 as well as a lined up orientation of the tubular enclosure sections 6 and 15 connected to these flanges. The flange connected between flanges 14 and 17 is largely free of lateral deformation forces even if the maximally permissible tolerances occur, because of the advantageous design of the end section 4 of the generator takeoff 3.

The electrically conducting connection between the transformer bushing 18 and the inner conductor 5 is accomplished by metallic, highly flexible expansion strips 19, so that any non-parallelism between the end face of the bushing 18 and the end face of the inner conductor 5 which might occur, as well as tolerances in the axial direction at the point of contact can be compensated without difficulty.

The two already mentioned enclosure supports 7 and 8 have different functions and are of different design. The upper enclosure support 7 is designed as a fixed bearing. The enclosure bearing 8, which is arranged closer to the transformer, on the other hand, permits tilting the tubular enclosure perpendicular to its axis in two mutually perpendicular directions. The force required for the tilting can be supplied hydraulically or by means of tension and pressure screws.

FIG. 2 shows the detail A of FIG. 1. The third joint, which connects the two inner conductor sections 5 with each other and ensures tiltability in all directions, is constructed as a knuckle joint in the illustrated embodiment. The design of the knuckle joint is further illustrated by the cross-section along the line III—III in FIG. 2, as shown in FIG. 3. To the upper section of the inner conductor 5, two spaced, U-shaped rectangular profiles 22 are attached in an insulated manner. Between the two opposite, parallel surfaces of the rectangular profiles 22, a tilting tube 21 with square cross-section is rotatably supported on pins about an axis A1. At the two free surfaces of the tilting tube 21, a further pair of U-shaped profiles 23 is supported rotatably about an axis A2; these profiles have their other ends anchored in the lower part of the inner conductor 5. Thereby, mobility about the two mutually perpendicular axes A1 and A2 is obtained. As will be seen, such a knuckle joint is of simple design and can therefore be manufactured at low cost. In spite of the low cost, tiltability in all directions is achieved with, at the same time, great ruggedness and reliability.

The knuckle joint is insulated from the inner conductor parts 5, in order to prevent current from flowing through the movable parts of the knuckle joint. The current instead flows through metallic strips 24 which are attached peripherally to the two inner conductor parts and can follow any tilting movement of the joint without effort. Through the separation of the function of a joint and the function of electric conduction, a constant low contact resistance between the inner conductor parts is ensured and the design of the knuckle joint is not encumbered by having to include the necessary current carrying capacity. In addition, problems of charge flow through the movable parts of the joint are completely eliminated.

Instead of the knuckle joint, a ball joint can also be used, retaining all the advantages noted above.

FIG. 4 is a view in the direction C of FIG. 1 of the three end sections 6 of the generator takeoff associated with the three adjacent phases. The corresponding expansion compensators 12 of identical design are arranged in the tubular enclosures 6 so that two adjacent expansion compensators 12 are always mutually shifted in the axial direction. The same staggered arrangement was chosen for the expansion compensators 13. Through this arrangement the expansion compensators, which protrude somewhat beyond the diameter of the tubular enclosure, are not opposite each other. Thereby, the spacing between adjacent generator leadoffs can be kept small, since through this measure identical expansion compensators 12 and 13 of the adjacent phases are kept from touching each other.

It may further be seen from FIG. 4 that for optimum tiltability of the end sections 4 of the generator takeoff about the turning point 25, the knuckle joint 11 must be arranged so that its fulcrum lies in the middle of the length of the expansion compensators 12.

FIG. 5 illustrates a third joint connecting the two inner conductor sections 5 with each other in the form of a ball joint. Construction is essentially the same as that disclosed in connection with FIG. 2, with the exception of the joint itself. As illustrated, interposed between the two ends of the inner conductor five is a ball joint 26 shown schematically. As described above, the ball joint is insulated so as to prevent current flow therethrough. Rather, the current flows through the metallic bands 24 which bridge the ball joint and are periferally fastened to both inner conductor parts in the same manner disclosed in connection with FIG. 2.

In summary, it can be stated that with the generator takeoff according to the present invention, a simple and inexpensive solution for a problem of long standing, namely, tolerance equalization in connecting generator takeoffs to a block transformer housing, has been found. The end sections of such a generator takeoff can be tilted in all directions by the joint in the inner conductor as well as by two suitably arranged expansion compensators. Position deviations between the block transformer connections and the generator takeoff, that occur within the tolerance range, can thereby be compensated without the need to use special designs for flanges and fastening means and without stressing the simplified flange connection with strong reaction forces.

I claim:

1. In a metal encapsulated generator take off for generators of a large power rating coupling a single phase of the generator to a block transformer, the generator takeoff including an end section having a rigid inner conductor and a cylindrical gas-tight tubular enclosure which concentrically surrounds the inner conductor and on which the inner conductor is supported by support insulators, said tubular enclosure having spaced ring-like expansion compensators for taking up length changes caused by temperature variation, and in which the inner conductor is connected by means of expansion strips to the block transformer, the improvement comprising:
   (a) the expansion compensators for taking up length changes in said tubular enclosure being two spaced joints, one nearer to the transformer and one further away, each in the form of an expansion compensator and tiltable in all directions;
   (b) a third joint tiltable about two mutually perpendicular axes, which axes are also perpendicular to the longitudinal axes of the inner conductor, inserted in the inner conductor at the height of the one of said expansion compensators which is farther away from the transformer, said joint secured to said inner conductor in an insulating manner to prevent a flow of current therethrough; and (c) metallic strips bridging said third joint.

2. Apparatus according to claim 1, wherein said third joint is a ball joint.

3. Apparatus according to claim 1, wherein said third joint is a knuckle joint.

4. Apparatus according to claim 1 and further including metallic strips bridging said third joint.

5. Apparatus according to claim 4, wherein said third joint is fastened to said inner conductor in an insulated manner.

6. Apparatus according to claim 1, wherein said expansion compensators are aluminum compensators.

7. Apparatus according to claim 1, wherein the expansion compensator nearer the transformer is a neoprene compensator.

8. Apparatus according to claim 1, and further including an enclosure support having one of hydraulic means and tension and pressure screws such that it can be tilted in the radial direction supporting the end section of each phase of the generator takeoff.

9. Apparatus according to claim 1 wherein said transformer is a multi-phase transformer, a generator take off according to claim 1 being provided for each phase and wherein the expansion compensators associated with the tubular enclosures of different phases are mutually staggered in the axial direction.

* * * * *